United States Patent [19]

Tashiro

[11] 3,780,508
[45] Dec. 25, 1973

[54] HARVESTER PLATFORM SUSPENSION

[75] Inventor: Donald K. Tashiro, Hamilton, Ontario, Canada

[73] Assignee: International Harvester Company, Chicago, Ill.

[22] Filed: Aug. 1, 1972

[21] Appl. No.: 277,030

[52] U.S. Cl. ............................................. 56/208
[51] Int. Cl. ......................................... A01d 67/00
[58] Field of Search .................... 56/202, 228, 192, 56/12.3

[56] References Cited
UNITED STATES PATENTS
3,727,385  4/1973  Twidale et al. ....................... 56/208
3,574,990  4/1969  Calder ................................. 56/208

Primary Examiner—Antonio F. Guida
Attorney—Floyd B. Harman

[57] ABSTRACT

A windrower including a wheeled frame adapted to be towed behind a tractor and having a harvester platform on the frame for cutting a crop and depositing the crop unto the ground in a windrow. The platform is mounted on the frame by arm means and is moveable vertically by hydraulic lift cylinders. The platform is suspended by a pair of spring units and a pair of torsion bar assemblies which cooperate to floatably support the platform for movement relative to the frame as dictated by varying contour of the ground over which the windrower is moved.

10 Claims, 7 Drawing Figures

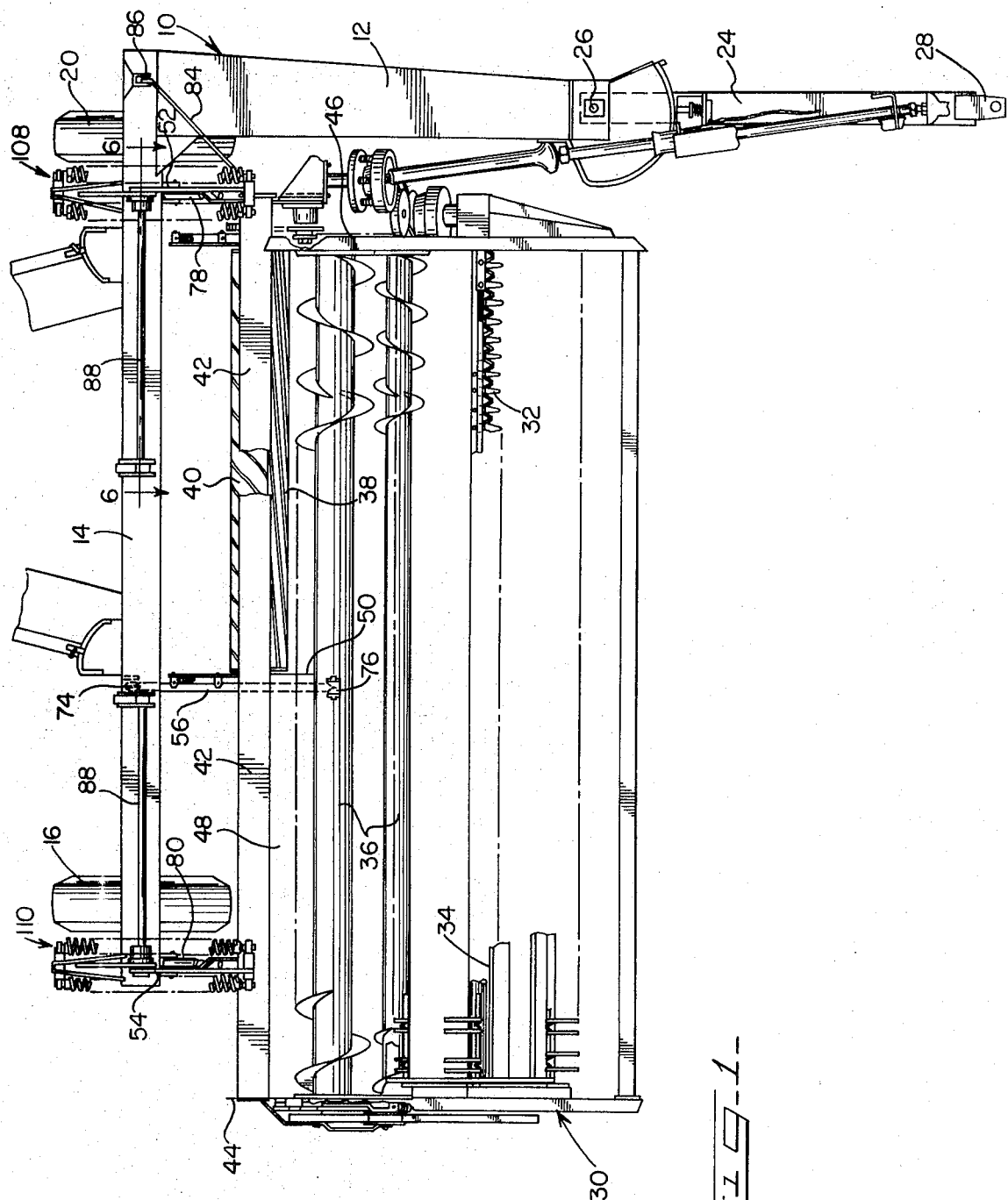

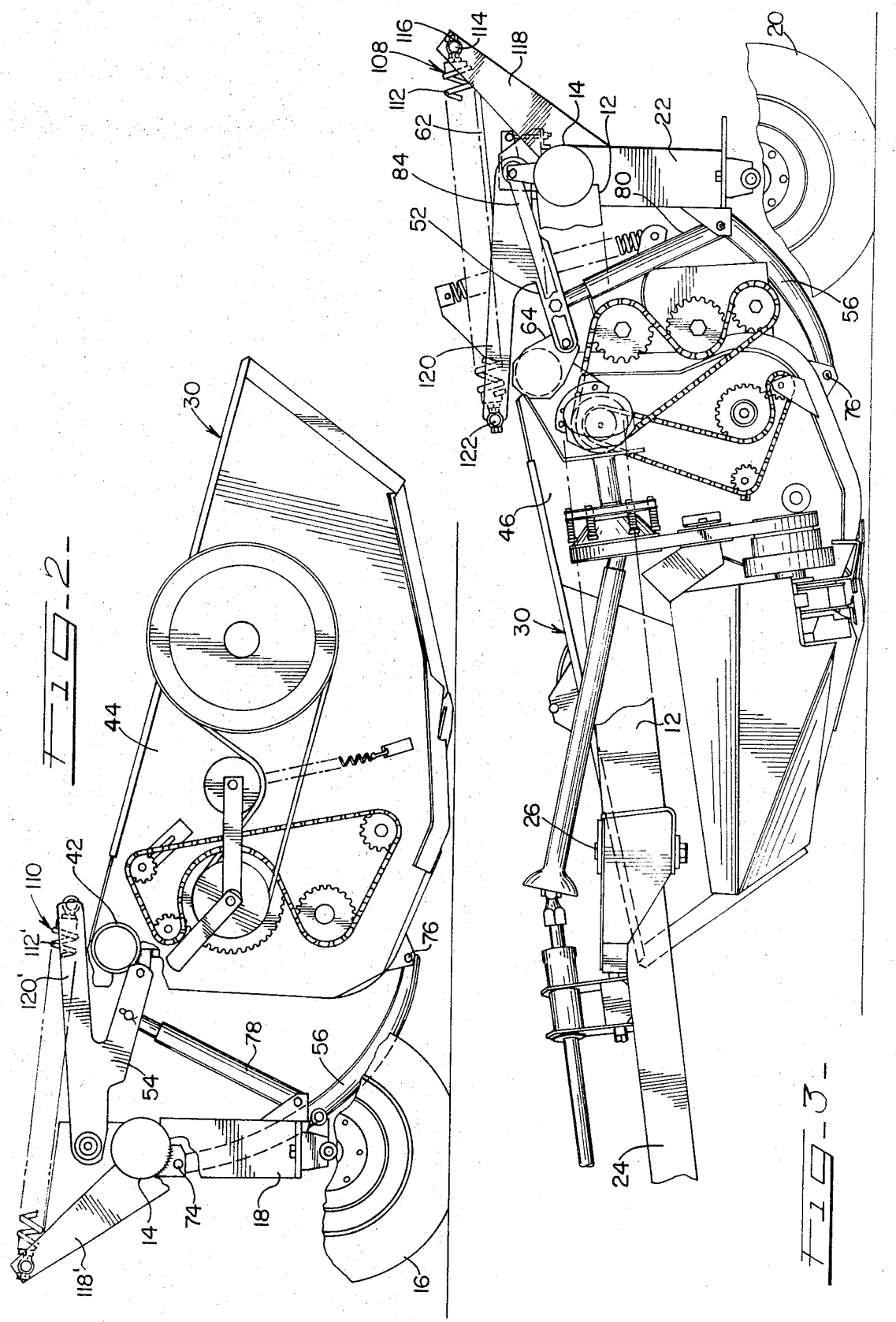

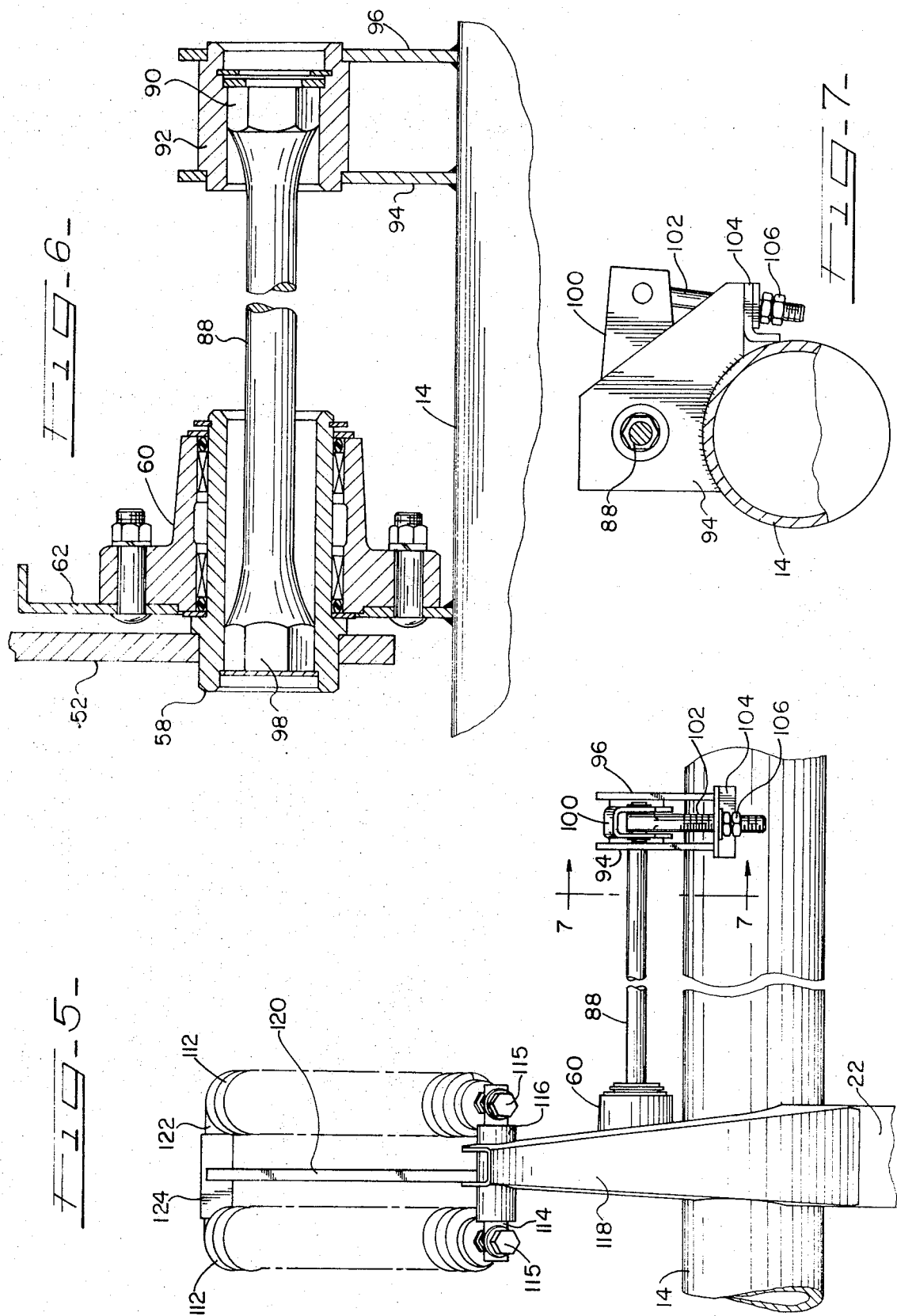

HARVESTER PLATFORM SUSPENSION

BACKGROUND OF THE INVENTION

1. Field of the Invention

Invention relates to harvesting machines of the type which cut a standing crop and convey the same into a swath or windrow. More particularly the invention relates to an improved system for floatably suspending a harvester platform from a wheeled frame or chassis.

2. Description of Prior Art

Harvester platforms for windrowers and the like should be capable of closely following the surface of the ground for uniform results in harvesting the crop. As the contour of the ground changes, the platform should adjust its position relative to the supporting chassis. Preferably the adjustment or movement should be in response to changes in ground contour in directions both parallel and transverse to the normal forward direction of travel.

Conventionally for many years elongated coil springs were employed to yieldably support the platform for movement relative to the chasses. Several of the problems associated with the use of coil springs are set forth in U.S. Pat. No. 3,574,990 wherein coil springs are eliminated. The floatability of the platform in the patent is provided by torsion bar assemblies.

While effective under certain applications, torsion bar assemblies may have practical limitations where, for example, a large and heavy platform must have a large range of movement, all as dependent upon design criteria of the total machine. In order to provide a large range of movement under such circumstances, the torsion bars themselves may have to be constructed of such length as to be impractical to incorporate within the dimensional limitations of the machine. Moreover, in any suspension system using a torsion bar assembly, it would be desirable to simplify the structure through which the load to be yieldably supported is transmitted to the torsion bar.

As set forth briefly in the above mentioned patent, it was sometimes necessary that the harvesting platform be disposed at a considerable distance forwardly of the chassis to accommodate the elongated coil springs. In a platform suspension system using coil springs, it would be desirable that the system permit the platform to be mounted closely adajcent to the chassis and yet accommodate coils springs of considerable length.

An important aspect of the design of a harvesting platform of the type which includes crop-conditioning rolls and a rearwardly opening crop discharge opening, is that the delivery or flow of the crop from the rolls through the opening should not be impeded or restricted by the structure which supports the platform from the chassis of the machine. The crop should flow freely into engagement with the windrow or swath-forming structure normally provided on machines of this type. The problem exists with platforms which have centrally disposed discharge openings, but may be even more difficult where the discharge opening is offset from the center of the platform.

SUMMARY

The invention provides an improved suspension and linkage system for a harvester platform wherein a combination of coil springs and torsion bar assemblies floatably support the platform from the framework of a crop harvesting machine. The suspension and linkage system is arranged to avoid interference with flow of the crop from a discharge opening which is disposed offset from the center of the platform. The coil springs of the system are accommodated on the harvesting machine while permitting desired close-coupling of the platform to the chassis. The torsion bar assemblies of the system are simplified in the elimination of load-transmitting linkages previously thought to be necessary.

An object of the invention is to provide a suspension system for a harvester platform, which system is capable of floatably supporting large and heavy platforms throughout a relatively large range of movement.

Another object is to provide a suspension system for harvesting platforms including torsion bar assemblies of simplified construction.

Another object is to provide a platform suspension system capable of utilizing coil springs of substantial length while still maintaining the platform in relatively close-coupled relation to the chassis frame to provide a compact design.

A still further object is to provide a suspension system for a harvester platform which will accommodate a non symmetrically disposed crop discharge area without interference with flow of the harvested crop.

BRIEF DESCRIPTION OF THE DRAWINGS

FIG. 1 is a plan view of a pull-type windrower including the novel suspension and linkage system of the invention;

FIG. 2 is an end elevation of the windrower of FIG. 1;

FIG. 3 is an end elevation view of the opposite end of the windrower of FIG. 1;

FIG. 5 is a fragmentary rear elevation view showing further details of the suspension system;

FIG. 6 is a fragmentary sectional view taken in the direction of arrow 6—6 of FIG. 1; and, FIG. 7 is an enlarged sectional view taken in the direction of arrow 7—7 of FIG. 5.

DESCRIPTION OF PREFERRED EMBODIMENT

Figure 4:
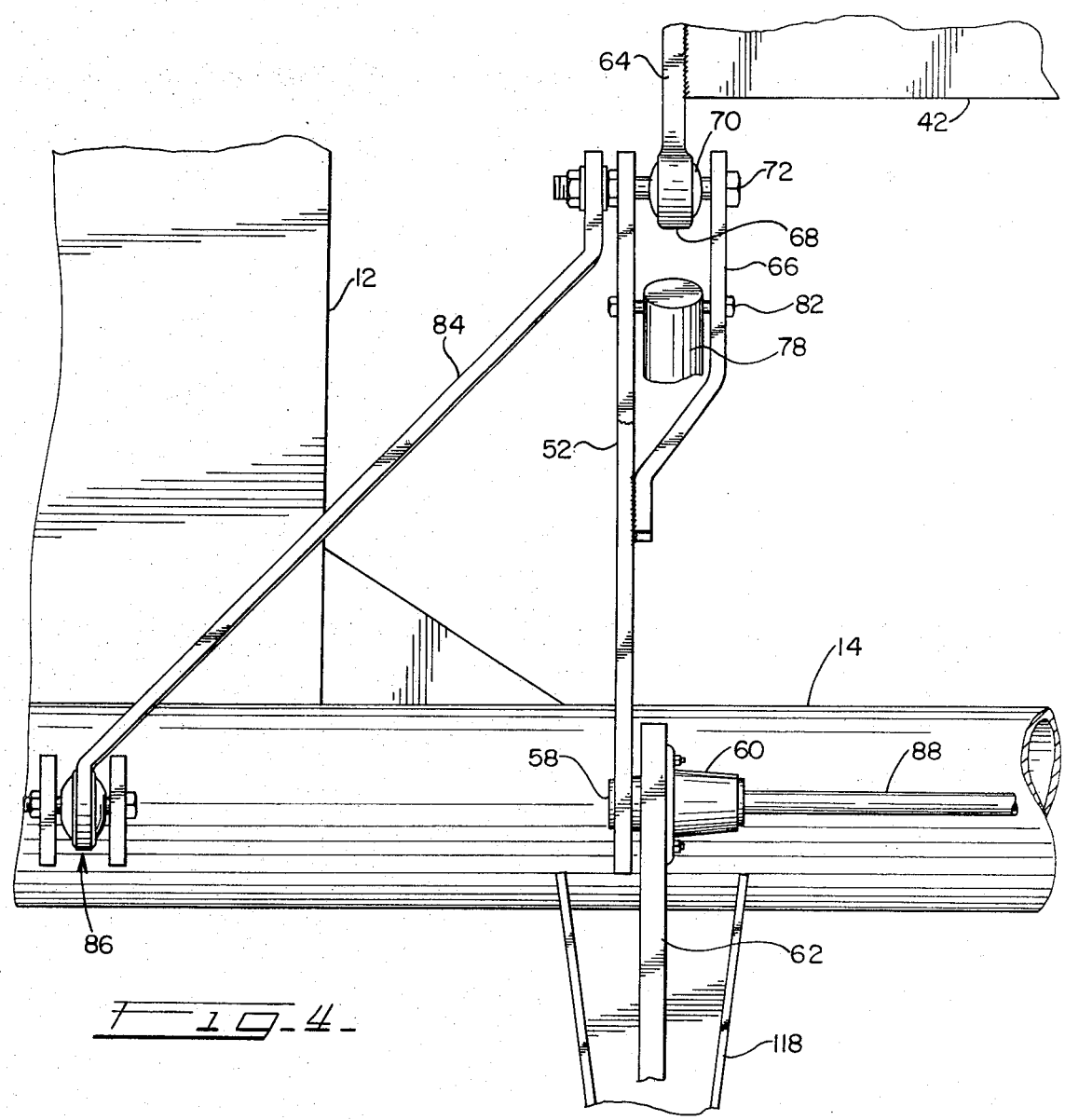
FIG. 4 is an enlarged fragmentary plan view of a portion of the linkage system of the invention.

Referring first to FIG. 1 there is shown a pull type windrower having a wheel-supported frame 10 of L-shape defined by a forward leg 12 and a transverse leg or beam 14. An outboard wheel 16 is journaled on a frame section 18 (FIG. 2) extending vertically downwardly from the frame leg 14. Similarly, an inboard wheel 20 is journaled on a frame section 22 (FIG. 3) extending vertically downwardly from the frame leg 14 proximate to the juncture therewith of the frame leg 12. A hitch tongue 24 is pivotally connected at 26 to the forward end of the frame leg 12. Suitable hitch structure 28 is mounted on the forward end of the tongue 24 for coupling the windrower to a towing tractor.

The windrower includes a crop harvester platform 30 having a reciprocating cutter assembly 32, a reel 34, a pair of auger conveyors 36, and a pair of conditioner rolls 38 and 40 for cutting, consolidating and conditioning the crop and depositing it onto the ground in a windrow.

The platform 30 includes a main frame member 42 of tubular section extending the length thereof and defining the upper rear edge of the platform. A pair of vertical end walls 44 and 46 extend forwardly from opposite ends of the frame member 42 to define the outboard and inboard ends respectively of the platform. The platform further includes a rear wall structure 48 extending downwardly and curving forwardly from the frame member 42.

As viewed in plan in FIG. 1, the rear wall 48 terminates at one end adjacent to the end wall 44 and at the other end in a vertically disposed edge 50 located approximately midway between the ends of the platform. The open area defined beneath the frame member 42 and between the edge 50 and the inboard wall 46 provides a crop discharge opening behind which the conditioner rolls 38 and 40 are disposed. Accordingly the crop is conveyed through the discharge opening for conditioning between the rolls.

In accordance with the invention, the platform 30 is mounted on the windrower frame 10 by a novel suspension and linkage system to be now described. The basic support elements comprise a pair of support arms 52 and 54 extending forwardly from the beam 14 to the platform frame member 42, and an arcuate link 56 extending forwardly and downwardly from the beam 14 intermediate the arms 52 and 54 into connection with the lower portion of the platform 30. The support arm 52 is disposed near the inboard end of the platform 30 and the arm 54 is disposed near the outboard end of the beam 14 and spaced somewhat inwardly from the outboard end of the platform.

The arms 52 and 54 are identical and thus a detailed description of the arm 52 will suffice for both. The rearward end of the arm 52 is fixed on a sleeve 58 shown in FIG. 6. The sleeve 58 is journaled in a housing 60 bolted to a vertical plate 62 fixed to the upper portion of the beam 14. The arm 52 projects forwardly into a ball and socket type connection with a plate 64 shown in FIGS. 3 and 4 fixed to the inboard end of the platform frame member 42. The connection of the arm 52 to the plate 64 is shown in detail in FIG. 4. A strap 66 is welded to the arm 52 so as to extend forwardly in spaced parallel relation as shown. A socket 68 is fixed to the plate 64 and is positioned between the arm 52 and the strap 66. A ball 70 is swively received within the socket 68 and is drilled to receive a bolt 72 extending through the strap 66 and arm 52.

The lower link 56 as best shown in FIG. 2 is pivotally connected to the underside of the beam 14 and to the lower portion of the platform 40 by ball and socket connections 74 and 76 respectively. The connections 74 and 76 are generally similar to the above described connection of the arm 52 to the platform 30. It will thus be seen that the ball and socket connection of the arms 52 and 54 and the link 56 to the platform, permit lateral tilting—so called radial float—of the platform.

The platform 30 is movable vertically between a lowered operative position and a raised transport position by means including a pair of hydraulic cylinder units 78 and 80 connected between the windrower frame 10 and the arms 52 and 54 respectively. The cylinder units 78 and 80 are pivotally connected to the lower ends of the vertical frame sections 18 and 22 respectively and extend forwardly and upwardly into pivotal connection with the respective arms 52 and 54. The connection of a cylinder unit to its respective arm is shown in FIG. 4 wherein a pin 82 connects the piston-rod end of the unit 78 between the arm 52 and strap 66. It will be appreciated that the platform 30 is raised and lowered in response to extension and retraction respectively of the cylinder units 78 and 80 through a suitable hydraulic power system incorporated into the towing tractor.

In order to prevent undue lateral movement of the platform 30 relative to the windrower frame, a bar 84 is pivotally coupled at its forward end to the bolt 72 (FIG. 4) and at its rearward end is pivotally coupled to the beam 14 by a ball and socket connection 86. Accordingly the bar 84 permits radial float of the platform but prevents movement laterally.

The suspension and linkage system of the invention includes means for floatably supporting the platform from the windrower frame during a harvesting operation. These means include a pair of torsion bar assemblies independently operative in conjunction with the pair of support arms 52 and 54. As shown generally in FIG. 1, each of the torsion bar assemblies includes an elongated torsion bar 88 disposed along and above the beam 14. As shown in greater detail in FIG. 6, the torsion bar 88 includes a hexagonal head 90 received in a complementary sleeve 92 journaled on a pair of brackets 94 and 96 on the beam 14. The bar 88 terminates at its opposite end in a hexagonal head 98 complementally received within the sleeve 58. It will be seen that the torsion bars 88, 88 are disposed coaxially along the axis defined by the pivot connections of the arms 52 and 54 on the beam 14.

Each of the torsion bar assemblies includes means by which the torsion bar may be adjustably preloaded to provide a selectively variable resistance. As best shown in FIGS. 5 and 7, a lever 100 of channel shape is rigidly secured to the sleeve 92 and extends rearwardly between the brackets 94 and 96. Pivotally mounted from an end of the lever 100 is a bolt 102 which projects downwardly through an angle member 104 secured to the beam 14 against the underside of the brackets 94 and 96. A pair of locknuts 106 is threaded on the bolt 102 in engagement with the angle member 104.

In addition to the torsion bar assemblies above described, a pair of spring units 108 and 110 is arranged for independent operation in conjunction with the support arms 52 and 54 respectively. The spring units are identical and thus a detailed description of the unit 108 will suffice for both. A pair of elongated coil springs 112 is connected to a cross bar 114 by a pair of adjustment bolts 115 as best shown in FIG. 5. The cross bar 114 is pivotally mounted in a sleeve 116 welded on a channel-shaped bracket 118 extending upwardly and rearwardly from the beam 14 and vertical frame section 22.

In order to accommodate the required length of the springs 112, each of the arms 52 and 54 includes an integral portion 120 extending forwardly and above the frame member 42 of the platform. The forward ends of the springs 112 are connected to a cross bar 122 pivotally mounted in a sleeve 124 welded on the forward end of the arm portion 120. The mounting structure for the other spring unit 110 is shown in FIG. 2 with similar parts designated by the same numerals which are primed.

In operation, the platform 30 is raised and lowered by extending and retracting the cylinder units 78 and 80. For crop harvesting, the units 78 and 80 are retracted and exhausted of pressure fluid thus lowering the platform into contact with the ground. In this position the torsion bar assemblies and spring units cooperate to floatably support the platform such that the platform will tend to move up and down in response to variations in the ground contour in directions both forwardly and transversely of the forward direction of travel. The amount of force tending to lift the platform can be selected by adjusting the position of the levers 100 of the torsion bars and further by adjusting the bolts 115 of the springs.

During the harvesting operation, the crop will be discharged through the transversely offset crop discharge opening for conditioning between the conditioner rolls 38 and 40, which in turn, project the crop rearwardly for deposit in a windrow. It will be seen that the suspension and linkage components are arranged to facilitate the flow of the crop from the offset crop discharge structure.

What is claimed is:

1. An apparatus for floatably supporting a crop harvesting platform on a mobile frame, comprising:
   a pair of support arms pivotally mounted on said frame about substantially coaxial pivots and extending forwardly in pivotal connection to the upper portion of said platform;
   a link pivotally connected to said frame intermediate said pair of support arms and extending forwardly in pivotal connection to the lower portion of said platform;
   a pair of power lift units pivotally interconnected between said pair of support arms respectively and said frame for raising said platform relative to said frame;
   a pair of elongated spring units connected between said pair of support arms respectively and said frame for creating a force tending to lift said platform;
   and a pair of torsion bars disposed longitudinally along the axis defined by said coaxial pivots with one end of each bar coupled to said frame and held against rotation and the opposite end of each bar secured to the respective support arms for yieldably resisting downward pivotal movement of said support arms to thereby resiliently support said platform.

2. A crop harvester including a wheeled frame and a harvester platform mounted on said frame, wherein the improvement comprises:
   lift arm means pivotally interconnecting said platform and said frame, said lift arm means being connected to said frame about a generally horizontal pivot axis;
   lift means for raising said platform relative to said frame;
   and a torsion bar operatively interconnected at one end to said frame and at the other end to said lift arm means for floatably supporting said platform relative to said frame, said torsion bar being disposed coaxially with said pivot axis.

3. The subject matter of claim 2, including coil spring means tensioned between said lift arm means and said frame for assisting said torsion bar in floatably supporting said platform.

4. The subject matter of claim 2, including means for adjustably preloading said torsion bar to provide selectively variable resistance to movement of said platform.

5. A crop harvester including a wheeled frame and a crop harvesting platform mounted on said frame, wherein the improvement comrpises:
   means mounting and floatably supporting said platform from said frame for raising and lowering movement relative to said frame, said means including a pair of upper lift arms pivotally mounted on said frame and extending forwardly in pivotal connection to the upper portion of said platform, each of said lift arms having an integral portion disposed above the pivotal connection to said platform, said means further including a pair of spring units disposed in tension between said portion of each lift arm respectively and said frame, said means further including a pair of torsion bars each having one end fixed to a respective lift arm and an opposite end coupled to said frame, whereby said spring units and said torsion bars cooperate to floatably support said platform relative to said frame.

6. A crop harvester including a mobile frame having an elongated beam disposed transversely to the forward direction of travel of the harvester, a crop harvesting platform disposed forwardly of said beam and including a rearwardly opening crop discharge area extending transversely from adjacent one end of said platform toward the other end thereof a distance substantially one-half the total length of said platform, wherein the improvement comprises:
   a pair of support arms pivotally mounted on said beam and extending forwardly in pivotal connection to the upper portion of said platform, one of said arms being connected to said platform proximate to said one end thereof, the other of said arms being connected to said platform proximate to said other end thereof so that said arms are spaced apart a distance greater than the transverse extent of said crop discharge area;
   an intermediate link pivotally connected to said beam and extending forwardly in pivotal connection to the lower portion of said platform, said link being connected to said platform proximate to an end of said crop discharge area whereby said one arm and said link are spaced apart a distance substantially the same as the length of said crop discharge area;
   and resilient means operatively interconnected between said beam and said platform for floatably supporting said platform relative to said beam.

7. The subject matter of claim 6, wherein said resilient means includes a pair of torsion bars operatively connected between said beam and said pair of arms respectively for yieldably resisting downward pivotal movement of said arms.

8. The subject matter of claim 7, wherein said pair of arms is pivotally connected to said beam about a generally horizontal pivot axis, said torsion bars being disposed coaxially with said pivot axis.

9. The subject matter of claim 6, wherein said resilient means includes a pair of spring units connected between said beam and the respective arms.

10. The subject matter of claim 9, wherein each of said arms includes an integral portion extending forwardly from said beam and above the pivotal connection of each arm to said platform, each of said spring units being connected to a respective one of said integral portions.

* * * * *